United States Patent
Lai et al.

(10) Patent No.: US 9,915,776 B2
(45) Date of Patent: Mar. 13, 2018

(54) LIGHT GUIDE MECHANISM OF FINGERPRINT RECOGNITION PLATE

(71) Applicant: CONCRAFT HOLDING CO., LTD., Grand Cayman (KY)

(72) Inventors: Shih-Chia Lai, Grand Cayman (KY); Yong-Hong Jiang, Grand Cayman (KY)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 194 days.

(21) Appl. No.: 14/845,867

(22) Filed: Sep. 4, 2015

(65) Prior Publication Data

US 2017/0068041 A1 Mar. 9, 2017

(51) Int. Cl.
*G06K 9/00* (2006.01)
*F21V 8/00* (2006.01)

(52) U.S. Cl.
CPC ......... *G02B 6/0083* (2013.01); *G02B 6/0068* (2013.01); *G02B 6/0073* (2013.01); *G02B 6/0088* (2013.01); *G06K 9/00046* (2013.01)

(58) Field of Classification Search
CPC .. G02B 6/0083; G02B 6/0068; G02B 6/0088; G02B 6/0073; G06K 9/00046
USPC .................................................. 382/124–127
See application file for complete search history.

(56) References Cited

U.S. PATENT DOCUMENTS

| 6,075,704 | A | * | 6/2000 | Amberg | G06F 13/409 |
| | | | | | 361/729 |
| 6,259,108 | B1 | * | 7/2001 | Antonelli | G06K 9/00046 |
| | | | | | 250/556 |
| 2002/0000056 | A1 | * | 1/2002 | Tsuji | G09F 9/302 |
| | | | | | 40/451 |
| 2002/0135572 | A1 | * | 9/2002 | Weindorf | G02B 6/0068 |
| | | | | | 345/204 |
| 2003/0063783 | A1 | * | 4/2003 | Higuchi | G06K 9/00046 |
| | | | | | 382/125 |
| 2006/0255907 | A1 | * | 11/2006 | Min | G06K 9/00013 |
| | | | | | 340/5.53 |
| 2007/0133847 | A1 | * | 6/2007 | Ogura | G06K 9/00013 |
| | | | | | 382/126 |
| 2008/0175444 | A1 | * | 7/2008 | Maro | G06K 9/00046 |
| | | | | | 382/115 |
| 2010/0320553 | A1 | * | 12/2010 | Setlak | G06F 21/32 |
| | | | | | 257/432 |

(Continued)

*Primary Examiner* — Andrew Moyer
(74) *Attorney, Agent, or Firm* — Rabin & Berdo, P.C.

(57) ABSTRACT

A light guide mechanism of a fingerprint recognition plate includes a frame, a light guide plate, first electrodes, second electrodes and light emitting diodes. The frame has a hollow portion and receiving troughs. Each of the receiving troughs forms a first through hole and a second through hole penetrating the frame. The light guide plate covers the hollow portion. The first electrodes are in the first through holes, and the second electrodes are in the second through holes. Each of the light emitting diodes is in the receiving trough and includes a first electrode pin and a second electrode pin. The first electrode pin pierces the first through hole to be connected to the first electrode. The second electrode pin pierces through the second through hole to be connected to the second electrode. The first electrode pin and second electrode pin are exposed from the bottom of the frame.

9 Claims, 7 Drawing Sheets

(56) References Cited

U.S. PATENT DOCUMENTS

| | | | | |
|---|---|---|---|---|
| 2012/0328170 A1* | 12/2012 | Wu | ............... | G06K 9/00046 382/124 |
| 2015/0146944 A1* | 5/2015 | Pi | ............... | H04L 63/0861 382/124 |
| 2016/0128143 A1* | 5/2016 | Kazikawa | ............... | G02B 6/0083 362/97.2 |

* cited by examiner

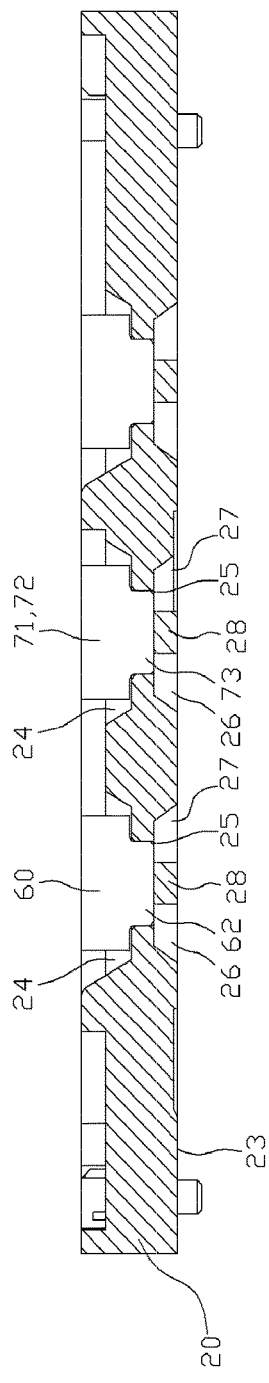
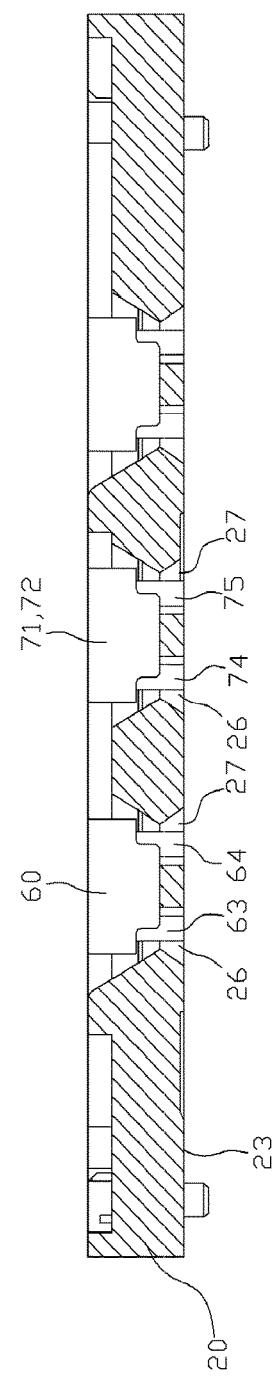

US 9,915,776 B2

LIGHT GUIDE MECHANISM OF FINGERPRINT RECOGNITION PLATE

BACKGROUND

Technical Field

The instant disclosure relates to a light guide mechanism of a fingerprint recognition plate, and more particularly, to a light guide mechanism of a fingerprint recognition plate utilized in an electronic device capable of allowing a user to put his or her finger thereon and providing sufficient brightness and contrast in the fingerprint collection process.

Related Art

Electronic devices, such as smart phones, laptop computers, flash drives, and even smart gate locks, are usually required to store important information such as private mails or photos. Sometimes these electronic devices can be utilized as keys for unlocking or security.

Safety measures that traditional electronic devices adopt to prevent information from being stolen or invaded are mostly password type. A password that a user set is usually consisted of certain guessable numbers such as numbers based on the user's or the user's family's birthday so as to avoid the password from being forgotten. However, such password is easy to be figured out by a third-party and the risk of important information being leaked is high.

To improve the reliability of security, a safety measure regarding fingerprint recognition has been adopted by some electronic devices. The advantage of the fingerprint recognition is that fingerprints cannot be faked. The level of security for keeping things secret based upon the fingerprint recognition is significant. As shown in FIG. 1, FIG. 1 illustrates a smart phone A, which is almost a necessity in daily life for most people. Users use the smart phones A for sending and receiving mails or storing private information.

The smart phone A includes the function of fingerprint recognition to enhance the level of security. For example, the smart phone A includes a fingerprint recognition area B. A user who wants to access the smart phone A is required to unlock the smart phone A in advance via the fingerprint collection process that the user's fingerprint is collected by the fingerprint recognition area B.

A conventional fingerprint recognition device includes a circuit board, an image capturing device disposed thereon, and a light guide plate disposed above the image capturing device. A light emitting diode is disposed on the side of the light guide plate. Light rays emitted by the light emitting diode can be transmitted into the light guide plate. When the user puts his or her finger on the fingerprint recognition area B, the brightness and contrast of the finger can be increased by the light guide plate, and, based on the increased brightness and contrast, the image capturing device is beneficial to collecting the fingerprint of the finger for further comparison.

The light emitting diode and the image capturing device of the conventional fingerprint recognition device are both disposed on the circuit board. As a result, the process of manufacturing is complex and the cost is accordingly high.

Another conventional fingerprint recognition device includes an image capturing device, a light guide plate, and a light emitting diode integrated with each other and then mounted on a circuit board. The volume of the structure of the fingerprint recognition device is fairly large. Consequently, the size of the smart phone including the fingerprint recognition device is accordingly large and is hard to be thin and portable.

SUMMARY

According to the aforementioned prior art, a light guide mechanism of a fingerprint recognition plate which is utilized in an electronic device, is capable of allowing a finger to put thereon, provides sufficient brightness and contrast in the fingerprint collection process, and is as thin and portable as possible, and a manufacturing method of the light guide mechanism are needed.

To address the above issues, the instant disclosure provides a light guide mechanism of a fingerprint recognition plate and a manufacturing method thereof. In particular, the light guide mechanism of the fingerprint recognition plate is utilized in an electronic device, is capable of allowing a user to put his or her finger thereon, and provides sufficient brightness and contrast in the fingerprint collection process.

According to an embodiment of the instant disclosure, a light guide mechanism of a fingerprint recognition plate and a manufacturing method thereof comprises a frame with a hollow portion, a plurality of light emitting diodes, and a light guide plate. The manufacturing method comprises forming a frame containing mixed materials having plastic materials and metallic materials in a manner of injection molding, forming patterns on the frame in a manner of laser engraving, and forming electric conductive portions in the patterns of the frame in a manner of electroplating or electroless plating. In this manner, the frame is formed with electric conductive circuit. The light emitting diodes are mounted on the electric conductive portions of the frame by the surface mount technology (SMT) process. Light rays emitted by the light emitting diodes can be transmitted in the light guide plate.

When the frame is formed via the laser direct structuring process combining with electroplating process, the size of the frame can be as small as possible. Under the circumstance that the frame is utilized in an electronic device, the electronic device can be thin and compact.

The features of the instant disclosure will no doubt become understandable to those of ordinary skill in the art after reading the following detailed description of the preferred embodiment that is illustrated in the various figures and drawings.

BRIEF DESCRIPTION OF THE DRAWINGS

FIG. 8 illustrates a cross-sectional view taken along the line 8-8 of FIG. 7; and FIG. 9 illustrates a cross-sectional view taken along the line 9-9 of FIG. 7.

DETAILED DESCRIPTION

Figure 1:
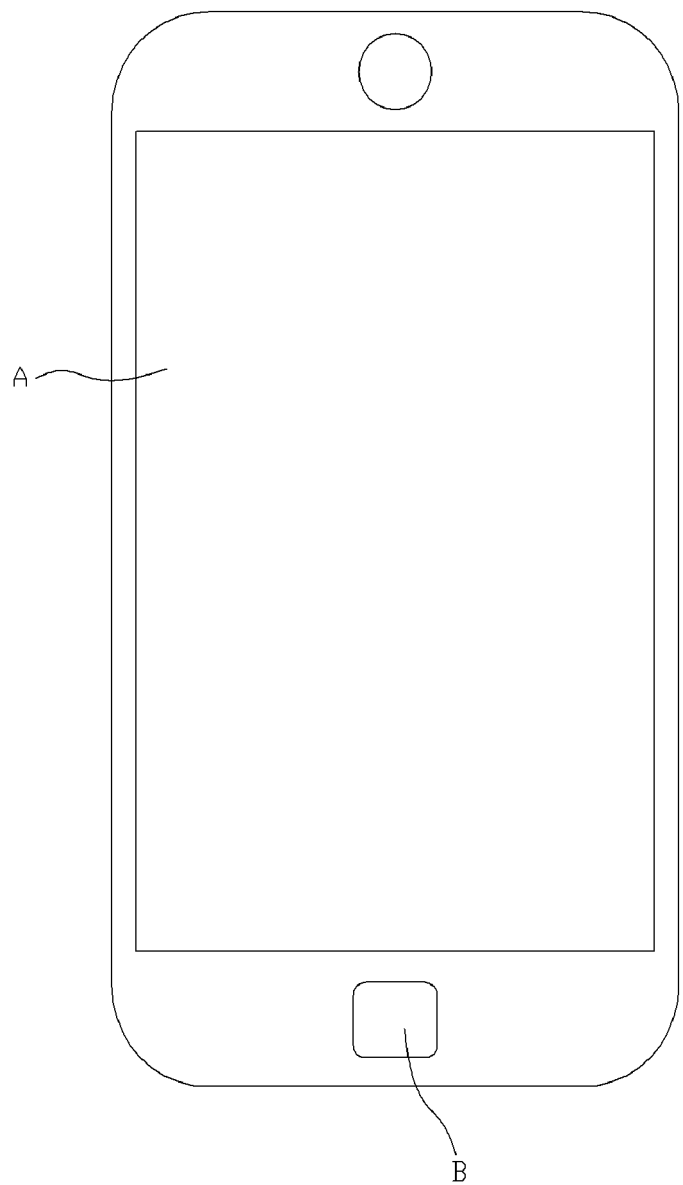
FIG. 1 illustrates a perspective view of a conventional smart phone.
Figure 2:
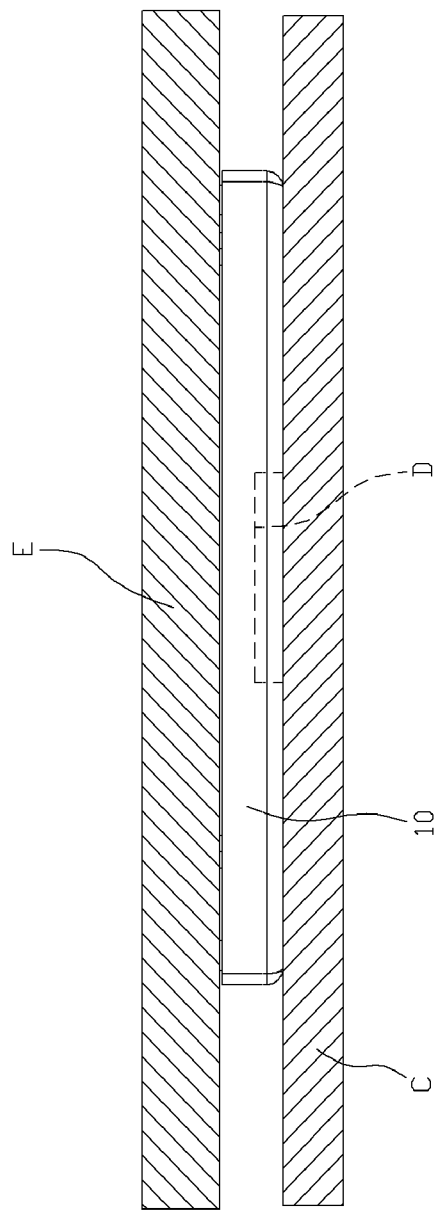
FIG. 2 illustrates a cross-sectional view of a light guide mechanism according to an embodiment of the instant disclosure.

Referring to FIG. 2, the instant disclosure relates to a light guide mechanism utilized in a fingerprint recognition plate. The light guide mechanism 10 of the fingerprint recognition plate is capable of being mounted on a circuit board C and encompassing an image capturing device D.

In the embodiment, the light guide mechanism 10 of the fingerprint recognition plate is, but is not limited to, installed in a smart phone. The light guide mechanism 10 of the fingerprint recognition plate is not only mounted on the circuit board C and encompasses the image capturing device D but is also covered by a protective plate E. As a result, the light guide mechanism 10 of the fingerprint recognition plate is fixed between the circuit board C and the protective plate E. In the embodiment, the protective plate E can be made by glass, plastic, or other transparent materials.

Figure 3:
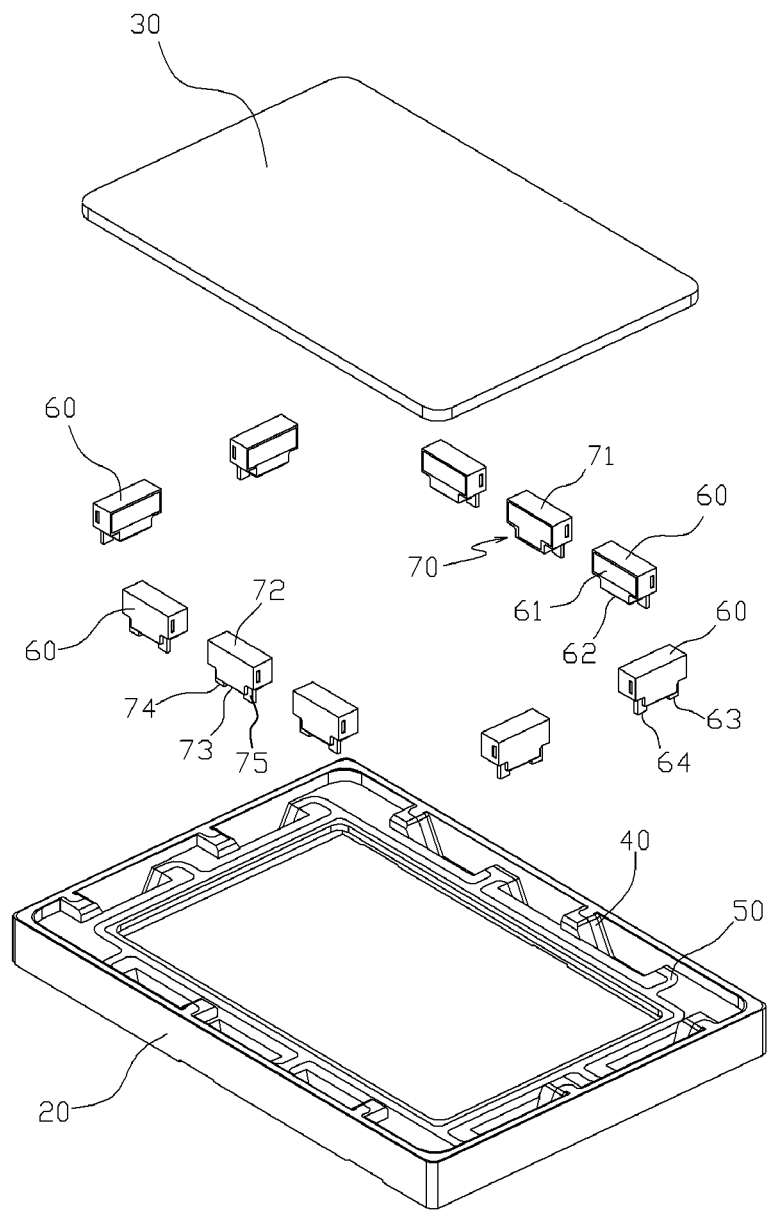
FIG. 3 illustrates an exploded view of the light guide mechanism according to an embodiment of the instant disclosure.
Figure 4:
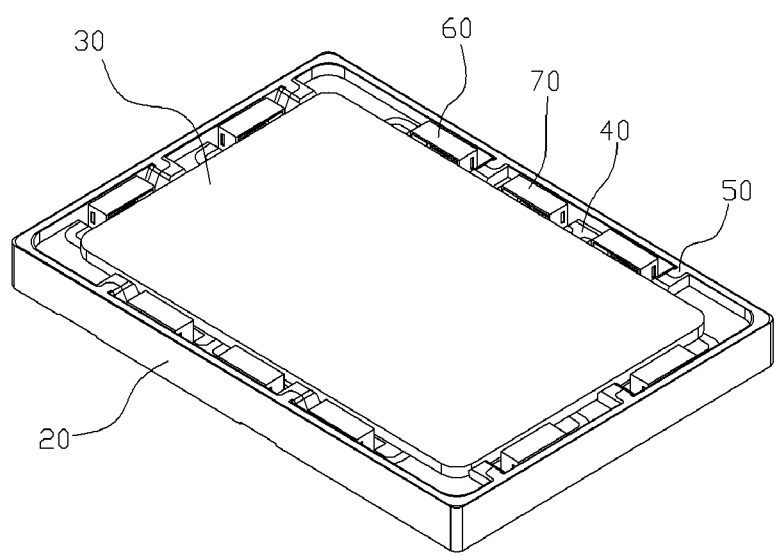
FIG. 4 illustrates a perspective view of the light guide mechanism according to an embodiment of the instant disclosure.

As shown in FIG. 3 and FIG. 4, the light guide mechanism 10 comprises a frame 20, a light guide plate 30, a plurality of first electrodes 40, a plurality of second electrodes 50, a plurality of light emitting diodes (LEDs) 60, and a pair of IR transceivers 70.

Figure 5:
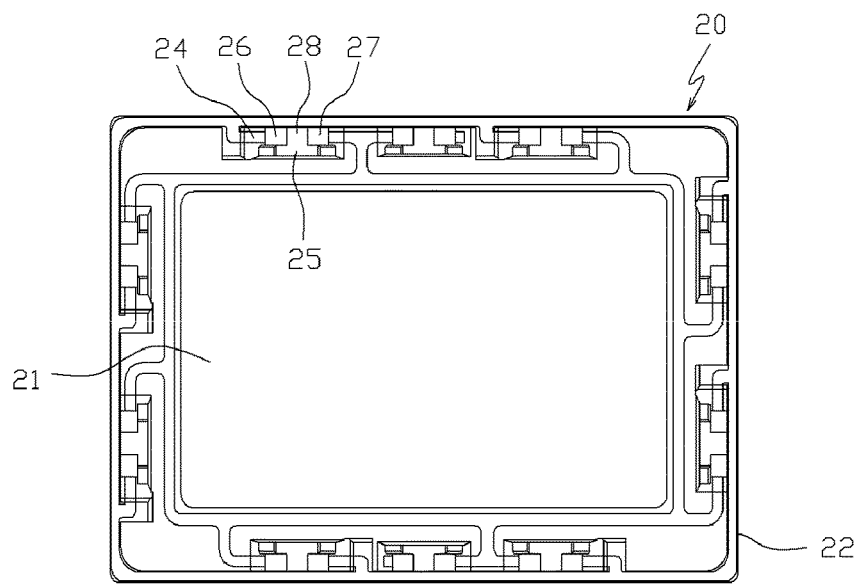
FIG. 5 illustrates a top view of the frame according to an embodiment of the instant disclosure.
Figure 6:
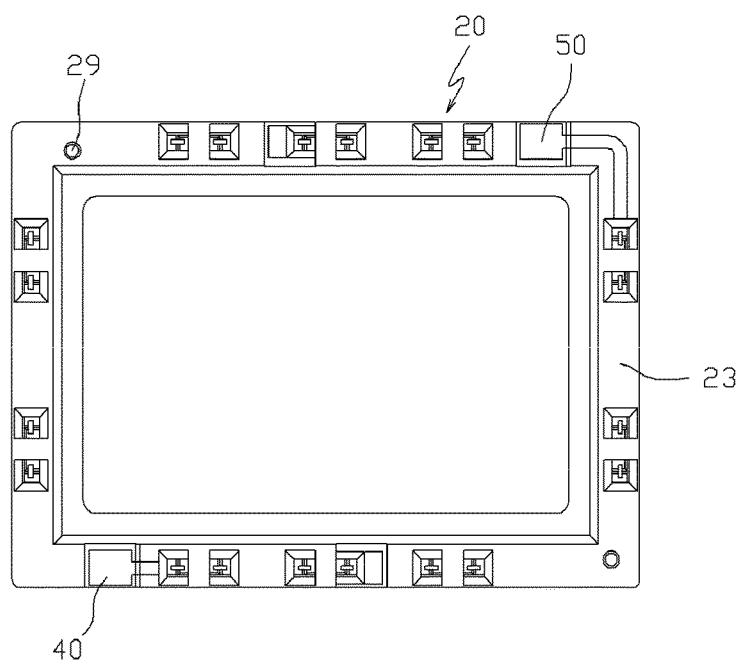
FIG. 6 illustrates a bottom view of the light guide mechanism according to an embodiment of the instant disclosure.
Figure 7:
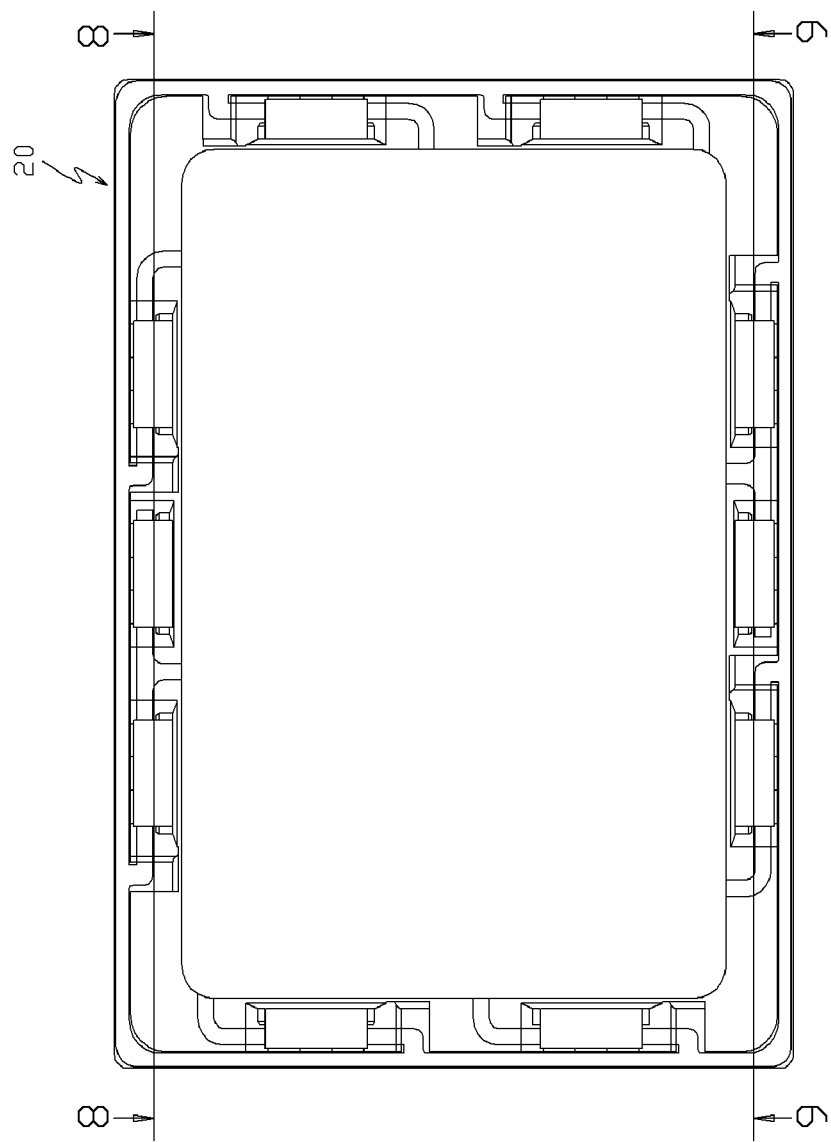
FIG. 7 illustrates a top view of the light guide mechanism according to an embodiment of the instant disclosure.

Referring to FIG. 5 and FIG. 6, the frame 20 is surrounded with a plurality of side bars and thereby forms a hollow portion 21 in the center of the frame 20. The frame 20 comprises an upper surface 22 and a lower surface 23 opposite to the upper surface 22. Each of the side bars forms a plurality of receiving troughs 24. Each of the receiving troughs 24 extends from the upper surface 22 to the lower surface 23 and forms a positioning slot 25, a first through hole 26 and a second through hole 27. The first through hole 26 and the second through hole 27 respectively penetrate the frame 20 from the upper surface 22 to the lower surface 23. There is a stop block 28 formed between the first through hole 26 and the second through hole 27. And there is at least a positioning pin 29 extending downwardly from the lower surface 23 of the frame 20.

As shown in FIG. 3, the light guide plate 30 is disposed above the upper surface 22 of the frame 20 and covers the hollow portion 21 of the frame 20.

As shown in FIG. 3, FIG. 5, and FIG. 6, the first electrodes 40 are formed in the first through holes 26. In the embodiment, the first electrodes 40 extend to the upper surface 22 of the frame 20 and are electrically connected to one another on the upper surface 22. And at least one of the first electrodes 40 extends to the lower surface 23 of the frame 20.

The second electrodes 50 are formed in the second through holes 27. In the embodiment, the second electrodes 50 extend to the upper surface 22 of the frame 20 and are electrically connected to one another on the upper surface 22. And at least one of the second electrodes 50 extends to the lower surface 23 of the frame 20. Wherein, the first electrode 40 is spaced apart from and is insulated from the second electrode 50 on the frame 20.

In the embodiment, the frame 20, the first electrodes 40, and the second electrodes 50 are formed via a process comprising the injection molding and the laser direct structuring (LDS). Specifically, the process comprises forming the frame 20 containing mixed materials having plastic materials and metallic materials by the injection molding, and directly forming the first electrodes 40 and the second electrodes 50 on the frame 20 by the laser direct structuring and the electroplating. Therefore, the thickness of the frame 20 can be reduced so that the frame 20 is as thin as possible. In another embodiment, the frame 20, the first electrodes 40, and the second electrodes 50 can be formed via a process of the metal injection molding.

The LEDs 60 surround the light guide plate 30. Each of the LEDs 60 is respectively disposed in each of the receiving troughs 24. Each of the LEDs 60 has a side emitting area 61. Each of the side emitting areas 61 is located at the side edge of the light guide plate 30. Each of the LEDs 60 comprises a positioning block 62, a first electrode pin 63, and a second electrode pin 64 all protruding downwardly from the bottom of the LED 60. The positioning block 62 is located between the first electrode pin 63 and the second electrode pin 64. The lengths of the first electrode pin 63 and the second electrode pin 64 are greater than that of the positioning block 62.

Referring to FIG. 5, FIG. 7, FIG. 8, and FIG. 9, the positioning block 62 of each of the LEDs 60 is embedded in the positioning slot 25 of the receiving trough 24 and is disposed above the stop block 28. The first electrode pin 63 pierces through the first through hole 26 and is exposed from the lower surface 23 of the frame 20 to be electrically connected to the first electrode 40. The second electrode pin 64 pierces through the second through hole 27 and is also exposed from the lower surface 23 of the frame 20 to be electrically connected to the second electrode 50.

The pair of IR transceivers 70 comprises an IR transmitter 71 and an IR receiver 72. The pair of IR transceivers 70 is respectively disposed on two side bars opposite to each other of the frame 20. In the embodiment, the frame 20 is surrounded with two short side bars and two long side bars. The two short side bars are corresponding to and opposite to each other, and the two long side bars are corresponding to and opposite to each other. The pair of IR transceivers 70 is respectively disposed on the two long side bars. In other words, the IR transmitter 71 is disposed in one of the receiving trough 24 of one of the two long side bars, and the IR receiver 72 is disposed in one of the receiving trough 24 of the other one of the two long side bars. Such that the IR transmitter 71 and the IR receiver 72 are correspond to and opposite to each other. Each of the IR transmitter 71 and the IR receiver 72 respectively comprises a positioning block 73, a first electrode pin 74, and a second electrode pin 75 which are the same as those of each of the LEDs 60. The IR transmitter 71 and the IR receiver 72 can be respectively electrically connected to the first electrodes 40 and the second electrodes 50 in the first through holes 26 and the second through holes 27. The first electrode pins 74 and the second electrode pins 75 are exposed from the lower surface 23 of the frame 20.

As a result, referring to FIG. 2, FIG. 3, and FIG. 6, the light guide mechanism 10 of the fingerprint recognition plate of the embodiment can be electrically connected to the circuit board C via the first electrodes 40 and the second electrodes 50 extending to the lower surface 23 of the frame 20 when the light guide mechanism 10 is mounted to the circuit board C. The light guide mechanism 10 can also be electrically connected to the circuit board C via the first electrode pins 63, 74 and the second electrode pins 64, 75 of the LEDs 60 and the pair of IR transceivers 70. Therefore, the LEDs 60 and the pair of IR transceivers can be driven by the circuit board C.

When a user put his or her finger on the light guide plate 30, the pair of IR transceivers 70 senses that the finger is between the pair of IR transceivers 70 (between IR transmitter 71 and IR receiver 72), and the pair of IR transceivers 70 generates a signal to drive the LEDs 60 to emit light rays.

The light rays projected from the side emitting area 61 of each of the LEDs 60 enter the light guide plate 30 through the side edge of the light guide plate 30 to brighten the light guide plate 30. As a result, the image capturing device D on the circuit board C can capture a clear fingerprint image of the finger.

In the embodiment, the receiving troughs 24 are formed on the frame 20, and the LEDs 60 and the pair of IR transceivers 70 are received in the receiving troughs 24. The positioning blocks 62, 73 of the LEDs 60 and the pair of IR transceivers 70 are embedded in the positioning slots 24 of the frame 20; therefore, the LEDs 60 and the pair of IR transceivers 70 can be effectively fixed to the frame 20.

In addition, the height of the frame 20 can be significantly reduced when the frame 20 is formed by the LDS process; thus, the light guide mechanism 10 of the fingerprint recognition plate can be as thin as possible. Under the circumstance that the light guide mechanism 10 of the fingerprint recognition plate is utilized in an electronic device, the electronic device can be thin and compact. The time spent on the assembly process of the electronic device can be reduced. Accordingly, the working hour is shortened, the assembly process is more efficiency, and the cost is lower.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A light guide mechanism of a fingerprint recognition plate, comprising:
   a frame surrounded with a plurality of side bars and forming a hollow portion, the frame comprising an upper surface and a lower surface, each of the side bars forming a plurality of receiving troughs, each of the receiving troughs forming a first through hole and a second through hole that penetrates the frame from the upper surface to the lower surface;
   a light guide plate covering the hollow portion of the frame;
   a plurality of first electrodes in the first through holes of the frame;
   a plurality of second electrodes in the second through holes of the frame; and
   a plurality of light emitting diodes surrounding the light guide plate, each of the light emitting diodes being respectively disposed in each of the receiving troughs of the frame and comprising a first electrode pin and a second electrode pin, the first electrode pin piercing the first through hole to be electrically connected to the first electrode, the second electrode pin piercing the second through hole to be electrically connected to the second electrode, the first electrode pin and the second electrode pin being exposed from the lower surface of the frame, wherein each of the light emitting diodes comprises a positioning block protruding downwardly, each of the receiving troughs comprises a positioning slot formed downwardly and corresponding to each of the positioning blocks, and each of the positioning blocks is embedded in each of the positioning slots.

2. The light guide mechanism of a fingerprint recognition plate of claim 1, wherein the plurality of first electrodes are electrically connected to one another on the upper surface of the frame.

3. The light guide mechanism of a fingerprint recognition plate of claim 1, wherein at least one of the first electrodes extends to the lower surface of the frame to electrically connect to a circuit board disposed below the frame.

4. The light guide mechanism of a fingerprint recognition plate of claim 1, wherein the plurality of second electrodes are electrically connected to one another on the upper surface of the frame.

5. The light guide mechanism of a fingerprint recognition plate of claim 1, wherein at least one of the second electrodes extends to the lower surface of the frame to electrically connect to a circuit board disposed below the frame.

6. The light guide mechanism of a fingerprint recognition plate of claim 1, further comprising a pair of IR transceivers embedded in two corresponding positioning slots among the positioning slots and opposite to each other, wherein the pair of transceivers are respectively electrically connected to the first electrode and the second electrode.

7. The light guide mechanism of a fingerprint recognition plate of claim 1, wherein each of the positioning blocks is located between the first electrode pin and the second electrode pin of each of the light emitting diodes.

8. The light guide mechanism of a fingerprint recognition plate of claim 1, wherein the frame further comprises at least a positioning pin extending downwardly from the lower surface.

9. A light guide mechanism of a fingerprint recognition plate, comprising:
   a frame surrounded with a plurality of side bars and forming a hollow portion, the frame comprising an upper surface and a lower surface, each of the side bars forming a plurality of receiving troughs, each of the receiving troughs forming a first through hole and a second through hole that penetrate the frame from the upper surface to the lower surface;
   a light guide plate covering the hollow portion of the frame;
   a plurality of first electrodes in the first through holes of the frame;
   a plurality of second electrodes in the second through holes of the frame;
   a plurality of light emitting diodes surrounding the light guide plate, each of the light emitting diodes being respectively disposed in each of the receiving troughs of the frame and comprising a first electrode pin and a second electrode pin, the first electrode pin piercing the first through hole to be electrically connected to the first electrode, the second electrode pin piercing the second through hole to be electrically connected to the second electrode, the first electrode pin and the second electrode pin being exposed from the lower surface of the frame, wherein the frame comprises a stop block between the first through hole and the second through hole of each of the receiving troughs; and
   a pair of IR transceivers embedded in two positioning slots corresponding to and opposite to each other, wherein the pair of transceivers are respectively electrically connected to the first electrode and the second electrode.

* * * * *